United States Patent [19]

Tung et al.

[11] Patent Number: 4,525,532

[45] Date of Patent: Jun. 25, 1985

[54] IMPACT RESISTANT α-METHYLSTYRENE-STYRENE COPOLYMER BLENDS

[75] Inventors: Lu H. Tung; Grace Y. Lo; Jerald A. Griggs, all of Midland, Mich.

[73] Assignee: The Dow Chemical Company, Midland, Mich.

[21] Appl. No.: 525,335

[22] Filed: Aug. 22, 1983

[51] Int. Cl.$^3$ ............................................. C08L 53/02
[52] U.S. Cl. ...................................... 525/98; 525/314
[58] Field of Search .......................................... 525/98

[56] References Cited

U.S. PATENT DOCUMENTS

| | | | |
|---|---|---|---|
| 3,932,332 | 1/1976 | Douglas et al. | 525/98 |
| 4,163,031 | 7/1979 | Hannon et al. | 525/98 |
| 4,195,136 | 3/1980 | Sato et al. | 525/89 |

FOREIGN PATENT DOCUMENTS

| | | | |
|---|---|---|---|
| 0014947 | 9/1980 | European Pat. Off. | 525/316 |
| 21442 | 2/1982 | Japan | 525/89 |

*Primary Examiner*—Wilbert J. Briggs, Sr.
*Attorney, Agent, or Firm*—R. B. Ingraham

[57] ABSTRACT

α-Methylstyrene-styrene copolymer is blended with an α-methylstyrene-styrene diene block copolymer or copolymers to provide impact resistant molding material.

7 Claims, No Drawings

IMPACT RESISTANT α-METHYLSTYRENE-STYRENE COPOLYMER BLENDS

Synthetic resinous compositions particularly those based on vinyl or alkenyl aromatic monomers have found wide use in commerce. Such resins generally lend themselves to injection molding, extrusion, sheet forming and like processes. Polystyrene resins have been employed with great benefit in a variety of areas. Such resins generally are transparent and readily moldable and extrudable. However, such resins exhibit a relatively low impact resistance which limits their application. Elastomers of conjugated dienes have been admixed with such resins to provide improved impact resistance. Generally as the impact resistance is increased by the addition of elastomer, the heat distortion temperature of the resultant product is decreased and the resultant impact resistant polymers are not suited for applications which require exposure to elevated temperatures such as that encountered with boiling water. Polymers of α-methylstyrene generally exhibit a heat distortion temperature greater than that of the equivalent polymers of styrene. In order to obtain polymers having a higher heat distortion, monomers such as α-methylstyrene have been employed. α-methylstyrene has a relatively low ceiling temperature of about 61° C. The ceiling temperature is that temperature at which the rate of depolymerization equals the rate of polymerization. It has been found desirable to utilize copolymers of α-methylstyrene and styrene to obtain polymers having an increased heat distortion temperature over that obtained using styrene alone. The increase of heat distortion of poly(α-methylstyrene) over that of polystyrene is about 70° C. This magnitude often exceeds the requirement for many high heat applications. For example, in hot-fill food containers, the required heat distortion temperature is about 110° C. or approximately 15° C. above that of polystyrene. In retortable containers, about 130° C. is required, again an increment of 35° C. which is only half of the difference between poly(α-methylstyrene) and polystyrene. High energy consumption, however, always associates with the fabrication of high heat distortion polymers. To avoid paying unnecessary penalty for unneeded heat distortion temperatures, it has been found desirable to utilize copolymers of α-methylstyrene and styrene to obtain polymers having a selected increased heat distortion temperature over that of polystyrene.

U.S. Pat. No. 3,346,666 discloses the preparation of block copolymers having the configuration BAB where B represents a block of a conjugated diene elastomer and A represents a block of α-methylstyrene polymer formed from trimers and isomers. The polymer is terminated by the addition of carbon dioxide to provide a carboxyl terminated polymer which may be water dispersible or water soluble.

In U.S. Pat. No. 3,367,995, there is disclosed graft polymers of a diene rubber having a copolymer of styrene acrylonitrile and α-methylstyrene grafted thereon to provide a polymer having relatively high impact resistance and high heat distortion. In essence, the polymer is an ABS (acrylonitrile-butadiene-styrene) polymer wherein a portion of the styrene has been replaced with α-methylstyrene.

U.S. Pat. No. 3,912,793 discloses a polymer of the general configuration ABA where A represents an α-methylstyrene tapered block, and B represents a butadiene block. By tapered block is meant that the A block contains increasing amounts of diene monomer copolymerizing with α-methylstyrene as the A block approaches the B block. The products are alleged to be generally odorless and thermally stable.

In U.S. Pat. No. 3,925,512 there are disclosed copolymers having the general configuration of ACBCA and wherein A represents a block of poly alpha-methylstyrene, C represents a block of polystyrene and B is a block of polybutadiene.

In U.S. Pat. No. 4,076,768 there are disclosed polyvinyl aromatic monomers reinforced with a colloidal crosslinked elastomer for form molding compositions, the elastomer has the configuration AB or ABA wherein A represents vinyl aromatic block and B represents a conjugated diene block.

U.S. Pat. No. 4,089,913 discloses a block copolymer of a vinyl aromatic block and an elastomeric block of a conjugated diene plus a vinyl aromatic compound to result in a generally transparent polymer.

U.S. Pat. No. 4,201,848 discloses latex polymers of vinyl aromatic compounds plus other monomers having a molecular weight of from 3,000,000 to 5,000,000.

U.S. Pat. No. 4,232,137 shows a block copolymer of the general configuration $AB(BA)_n$ prepared by the polymerization of α-methylstyrene with an ebullient cooling wherein the A represents the α-methylstyrene polymers, B represents a conjugated diene block copolymer. A polymer of the AB configuration is formed and treated with a suitable coupling agent to form an ABA or $AB(BA)_n$ configuration.

British Pat. No. 1,414,924 discloses the preparation of block copolymers having the configuration ABC wherein A represents a block of α-methylstyrene, B is an elastomeric block and C is a block of polystyrene.

The publication Research Disclosure of October 1979, entry number 18617 discloses that polyalphamethylstyrene or copolymers of α-methylstyrene may be toughened by blending with elastomers having the configuration of AB wherein A represents a block of polystyrene and B represents a block of polybutadiene.

U.S. Pat. No. 4,277,591 discloses random copolymers of at least one conjugated diene with α-methylstyrene, the polymerization being initiated with an organolithium compound together with a compound of sodium, potassium, rubidium and cesium.

In British Pat. No. 1,264,741 there are disclosed block copolymers of the general configuration of $AB(BA)_n$ wherein B represents an elastomeric block and A represents a block of a random copolymer of styrene and α-methyl-styrene. The teachings of the foregoing cited references are herewith incorporated by reference thereto.

None of the foregoing provides a material which is entirely suited for injection molding or extrusion into film for the packaging of hot filled foods, cosmetics and the like, and provides a combination of dishwasher proof, suitable for tableware, permissible for food contact, non-toxic, and exhibiting highly desirable stress crack resistance together with desirable tensile strength, impact resistance, elongation and heat distortion.

It would be desirable if there were available an improved synthetic resinous composition for molding and extrusion which exhibited desirable physical properties.

It would also be desirable if there were available an improved resinous composition of desirable physical properties suitable for food contact.

It would also be desirable if there were available an improved synthetic resinous material readily injection molded and extruded, exhibiting impact resistance and elongation, having a heat distortion temperature sufficiently high to permit contact with boiling water.

These benefits and other advantages in accordance with the present invention are achieved in a copolymer blend, the blend comprising a copolymer of alkenyl aromatic monomer and isopropenyl aromatic wherein the ratio of isopropenyl aromatic monomer to alkenyl aromatic monomer is from about 1 to 99 to 99 to 1 in admixture with a member selected from a group consisting of (1) an AB block copolymer
(2) an ABA block copolymer
(3) an AB(BA)$_n$ block copolymer and mixtures thereof wherein n is an integer of from about 2 to 10; A represents a block of an alkenyl aromatic monomer isopropenyl aromatic monomer copolymer; B is a block of conjugated diene elastomer; the A blocks having a ratio of isopropenyl aromatic monomer to alkenyl aromatic monomer of from about 1 to 99 to 99 to 1 by weight, the molecular weight of the alkenyl aromatic monomer isopropenyl aromatic monomer copolymer being from about 50,000 to 1,000,000, the block copolymers containing from about 10 to 90 weight percent of a diene elastomer selected from the group consisting of polybutadiene, polyisoprene and copolymers of butadiene and isoprene wherein the 1,2-vinyl content is from about 8 to 50 weight percent; the block copolymers having a molecular weight of from about 30,000 to about 800,000.

By the term alkenyl aromatic monomer is meant a monomer of the formula:

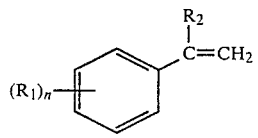

where n is an integer from 0 to 3, $R_1$ is an alkyl radical containing up to 5 carbon atoms and $R_2$ is hydrogen. Preferred alkenyl aromatic monomers include styrene, vinyltoluene, (all isomers alone or in admixture); particularly desirable is paravinyltoluene. Isopropenyl aromatic monomers are obtained when $R_2$ is a methyl group.

By the term isopropenyl aromatic monomer is meant a compound of the above formula wherein $R_1$ is hydrogen or an alkyl radical containing up to 5 carbon atoms and $R_2$ is methyl, for example, α-methylstyrene.

Copolymers of alkenyl aromatic monomer and an isopropenyl aromatic monomer are readily prepared by the method set forth in U.S. Pat. No. 4,277,591, the teachings of which are herewith incorporated by reference thereto. Such copolymers are also readily prepared using a mono or dilithium initiator dispersed in isopropenyl aromatic monomer with or without a solvent and by adding the alkenyl aromatic monomer such as styrene either continuously or intermittently to thereby provide the desired random copolymer. Beneficially, the weight ratio of isopropenyl aromatic monomer to alkenyl aromatic monomer varies from about 1 to 99 to 99 to 1 and preferably from about 30 to 70 to 71 to 29. The copolymer of alkenyl aromatic monomer and isopropenyl aromatic monomer has a molecular weight of from about 50,000 to 1,000,000 and most advantageously from about 70,000 to about 500,000 grams per mole.

Block copolymers suitable for the practice of the present invention and a method for the preparation thereof are disclosed in British Pat. No. 1,264,741 and in pending U.S. patent application Ser. No. 297,371, filed Aug. 28, 1981, since British Pat. No. 1,264,741 cannot be used for low 1,2 content B-block. Such block copolymers have the configuration of AB(BA)$_n$ where B represents an elastomeric polymer and A represents a random copolymer of an alkenyl aromatic monomer and an isopropenyl aromatic monomer; n is an integer of from 0 to 10. Such polymers may be used alone or in admixture with each other. The weight proportion of the B block in such block copolymers may vary from 10 to 90 weight percent. The 1,2 vinyl content of the B block is beneficially from about 8 to 50 percent of the B block, the 1,2 vinyl content being computed from the infrared spectrometer method of P. Morero et al., as set forth in Chim. Ind. Milan, configuration 41, 758 (1959). The A portion of the block is a random copolymer of alkenyl aromatic monomer of isopropenyl aromatic monomer while the total molecular weight of the block copolymer is from about 30,000 to 800,000 grams per mole and beneficially from about 50,000 to 500,000 grams per mole. The block copolymers suitable for the practice of the present invention may be prepared by a variety of methods well known to those skilled in the art. A particularly desirable method for the preparation of such block copolymers is by the use of a multifunctional lithium containing initiator wherein the conjugated diene component is initially polymerized to provide a multifunctional living conjugated diene copolymer which may be a homopolymer of butadiene, a homopolymer of isoprene or a copolymer of butadiene and isoprene. Polymerization with the multifunctional, or in the case of preparing a polymer of AB configuration a monofunctional, initiator, such polymerization of the conjugated diene may take place in a non-reactive solvent, or in the presence of the isopropenyl aromatic monomer. If it is desired that a graded block copolymer be prepared, such polymerization of the diene may be accomplished in the presence of the A aromatic monomer wherein initially the conjugated diene olefin enters preferentially into the polymerization reaction; and as the polymerization of the conjugated diene olefin is completed, the alkenyl aromatic monomer forms a more or less random copolymer which increases in alkenyl aromatic monomer content to form a graded block copolymer. Suitable polymerization initiators are disclosed in the following U.S. Pat. Nos.: 3,660,536; 3,663,634; 3,668,263; 3,684,780; 3,725,368; 3,734,973; 3,776,893; 3,776,964; 3,784,637; 3,787,510; 3,954,894; 4,172,100; 4,172,190; 4,182,818; 4,196,153; 4,196,154; 4,200,718; 4,201,729; and 4,205,016; the teachings of which are herewith incorporated by reference thereto.

Polymer blends in accordance with the present invention may be formed by any of the conventional means of blending polymers. The block copolymers or mixture of block copolymers and the copolymer of the alkenyl aromatic monomer and isopropenyl aromatic monomer may be mechanically blended using a variety of malaxating and mixing machines including extruders compounding rolls, Banbury mixers and the like. The copolymer and block copolymer are readily blended by dissolving the polymers in an appropriate solvent, such as benzene, admixing the two solutions and either evaporating the solvent or precipitating the polymers by the addition of a suitable nonsolvent such as methanol. The precipitate may then be washed, dried and fabricated by the desired method, such as injection molding or extrusion. Alternatively, a mixed solution of copolymer and block copolymer may be employed as a coating material by applying the mixture of solutions to a surface and removing the solvent by evaporation. Alternatively, the block copolymer or mixture of block copolymers may be dissolved in a non-reactive solvent such as benzene, cyclohexane or the like; or a reactive solvent such as α-methylstyrene and the vinyl aromatic monomer/isopropenyl aromatic monomer polymer polymerized in the presence of the block copolymer. Any of the foregoing methods are capable of preparing polymer blends in accordance with the present invention. However, a desirable method is the polymerization of the alkenyl aromatic monomer and isopropenyl aromatic monomer random copolymer in the presence of a block copolymer or a mixture of block copolymers as hereinbefore specified.

So-called radial, star or multi-armed polymers desirably are prepared employing a polyfunctional initiator using the general procedure hereinbefore set forth wherein a tapered diene polymer block copolymer may be obtained or a homopolydiene block obtained depending upon the sequence of monomer addition as hereinbefore set forth. An alternate route to radial block copolymers is to prepare a living polymer of the AB configuration, employing a multifunctional coupling agent; for example, silicon tetrachloride, divinylbenzene and like, well known polyfunctional coupling agents.

The present invention is further illustrated, but not limited, by the following examples. All reactions and polymerizations described below were conducted under a dry nitrogen atmosphere. All glass containers were baked at 150° C. overnight, and flushed with nitrogen before use. The transfer of monomers and reagents was carried out with nitrogen flushed syringes. All monomers and reagents were purified according to the standard procedure used in anionic polymerization.

PREPARATION I

α-Methylstyrene-Styrene Copolymers

Three α-methylstyrene-styrene copolymers were prepared by anionic polymerization using secondary butyllithium or n-butyllithium as initiator and an excess of α-methylstyrene monomer as a solvent. Technical grade α-methylstyrene was purified by passing through a bed of activated alumina. Freshly distilled styrene was employed. The reaction mixture was blanketed with dry nitrogen. Impurities in the system were neutralized by the addition of an equivalent amount of n-butyllithium. The monomer mixture was heated to about 60° C. and predetermined quantity of polymerization initiator added. The contents of the reaction vessel rose in temperature due to the heat of polymerization. When the temperature of the reaction mixture returned to the initial polymerization temperature, it was taken as an indication that all of the styrene monomer had been consumed, and that polymerization had ceased. The resultant living polymer was inactivated by the addition of isopropanol. The copolymers were recovered by precipitation with methanol, the precipitate subsequently dissolved in methylene chloride and reprecipitated with methanol. Portions of the methylene chloride solution were retained for additional blending experiments. The precipitated portions of the sample were dried in a vacuum over night at a temperature of about 58° C. The dried samples in powder form were then mixed with a methanol solution of stabilizer and anti-oxidant having the trade designations of Ionol and Irganox 1076 and dried again under vacuum at room temperature. The amounts of Ionol and Irganox 1076 were approximately 0.2 weight percent each by weight based on the weight of the copolymer sample. The polymerization conditions for the preparation of the styrene-α-methylstyrene copolymers are set forth in Table 1A.

TABLE 1A

| | Polymerization Conditions | | |
|---|---|---|---|
| | Feed Weight Percent | | s-BuLi |
| Copolymer | α-Methylstyrene | Styrene | me/l* |
| A | 95.17 | 4.83 | 0.44 |
| B | 95.21 | 4.79 | 0.43 |
| C | 95.11 | 4.89 | —** |

*Milliequivalent per liter.
S-BuLi = secondary butyllithium.
**Due to the excessive residue impurities in the system, s-BuLi amount for initiation and initiation temperature were not well controlled.

The molecular weight of the samples was determined by gel permeation chromatography (GPC) and the proportion of α-methylstyrene (α-MS) determined by nuclear magnetic resonance (nmr). These values are set forth in Table 1B.

TABLE 1B

| | Molecular Weights and Composition | |
|---|---|---|
| | | Wt. % αMS* |
| Copolymer | GPC Molecular Weights | By nmr |
| A | 325,000 | 49 |
| B | 227,000 | 52 |
| C | 132,000 | 49 |

*αMS = α-methylstyrene.

Each of the three copolymers were compression molded into test bars at a temperature of about 220° C., the tensile strength and elongation were determined as well as the notched izod impact strength and the Vicat softening point. These properties are set forth in Table 1C.

TABLE 1C

| | Physical Properties | | | |
|---|---|---|---|---|
| | Tensile | | Notched | Vicat |
| | Strength | | Izod | Softening |
| Copolymer | psi | Elongation % | ft-lb/in | Point °C. |
| A | 5259 | 1.4 | 0.37 | 115 |
| B | 3914 | 1.0 | 0.32 | 110 |
| C | 3518 | 0.8 | 0.21 | 116 |

PREPARATION II

α-Methylstyrene Styrene Copolymers

Two samples designated AA and BB of alpha-methylstyrene styrene copolymer were prepared by the same general procedure as in Preparation I except that methanol was not used to precipitate the products from their alpha-methylstyrene solutions. The resultant polymer syrups were concentrated to about 38 weight percent solids, by a vacuum distillation of monomer therefrom. The syrups were further devolatilized by placing in a tray in a vacuum oven at approximately 180° C. for a period of about 45 minutes after the polymer reached 170° C. The resultant polymer slabs were then cooled and ground into granules for subsequent blending experiments. The feed proportions and the molecular weights and compositions of the copolymers are set forth in Table 2.

TABLE 2

Copolymers AA and BB

| Copolymer | Feed wt. % αMS | Styrene | s-BuLi me/l | GPC Molecular weight | Wt. % α-MS by nmr |
|---|---|---|---|---|---|
| AA | 95.21 | 4.79 | 0.75 | 165,000 | 48 |
| BB | 95.25 | 4.74 | 0.79 | 138,000 | 45 |

PREPARATION III

α-methylstyrene-Styrene Copolymers

Two α-methylstyrene-styrene copolymer samples, CC and DD, were prepared by a procedure that uses five consecutive polymerizations in a single α-methylstyrene solution. Each run is thus a blend of five polymers. The procedure for each of the consecutive polymerizations was the same as that described in Preparation I. When the styrene monomer of the first polymerization was consumed, usually in about 20 minutes, the polymerization reaction stopped automatically. This is because the temperature was maintained at above the ceiling temperature of poly(α-methylstyrene) and homopolymerization of α-methylstyrene could not take place. A quantity of polymer syrup was removed at this time from the reactor for the percent solids analysis. The reaction mixture was then cooled to about 60° C. and a second amount of styrene was charged into the reactor. This was followed by a second amount of s-butyllithium to initiate the second polymerization. This process was repeated five times. After the final polymerization 12 ml of isopropyl alcohol was added to inactivate any living polymer. A 0.2 weight percent of the phenolic antioxident was added based on the solids being contained within the reaction mixture. The polymer was recovered by using the procedure appeared in Preparation II. The quantities of the monomers and initiators for the 5 consecutive polymerizations are listed in Tables 3A and 3B. The copolymer molecular weights and compositions are listed in Table 3C.

TABLE 3A

Polymerization Conditions for CC

| Step | α-MS kg | Styrene kg | S-BuLi Me* | Kg Removed for analysis | Wt. % Solids |
|---|---|---|---|---|---|
| 1 | 52.51 | 3.35 | 73.05 | minor | 11.8 |
| 2 | 0 | 3.15 | 54.64 | minor | 21.6 |
| 3 | 0 | 2.95 | 43.14 | minor | 29.9 |
| 4 | 0 | 2.77 | 54.35 | minor | 37.0 |
| 5 | 0 | 2.60 | 40.26 | minor | 43.0 |

*Me = milliequivalents

TABLE 3B

Polymerization Conditions for DD

| Step | α-MS kg | Styrene kg | S-BuLi millieq. | Kg Removed for analysis | Wt. % Solids |
|---|---|---|---|---|---|
| 1 | 32.78 | 2.01 | 48.45 | 1.37 | 10.7 |
| 2 | 0 | 1.66 | 18.48 | 0.94 | 19.6 |
| 3 | 0 | 1.54 | 25.30 | 0.90 | 27.1 |
| 4 | 0 | 1.43 | 27.63 | 0.70 | 33.6 |
| 5 | 0 | 1.34 | 18.48 | — | 38.9 |

TABLE 3C

Molecular Weights and Compositions of Copolymers CC and DD

| Sample | Molecular Weight | % α-MS |
|---|---|---|
| CC | 106,000 | 48 |
| DD | 155,000 | 48 |

PREPARATION IV

Tri-block copolymer of α-methylstyrene-styrene and 1,3-butadiene blocks (α-MS/S-B-α-MS/S) were prepared employing a difunctional anionic initiator as is disclosed in U.S. Pat. No. 4,196,154, the teachings of which are herewith incorporated by reference thereto.

The initiator 1,3-phenylene-bis(3-methyl-1-phenylpentylidene)bis(lithium) was prepared by dissolving 1,3-di-(1-phenylethenyl)benzene in dry toluene at a concentration of about 3 percent by weight. Two moles of secondary-butyllithium in cyclohexane were added to the toluene solution per mole of the phenylethenyl benzene. The secondary-butyllithium was about 1 molar. The addition was accomplished under a nitrogen purge at room temperature. The secondary-butyllithium added to the phenylethenyl benzene to provide the desired initiator after a period of about 90 minutes. The resultant initiator was storable at room temperature for several days without apparent loss of activity.

A nitrogen purged reaction vessel containing α-methylstyrene-styrene and 1,3-butadiene, all in purified form were contacted with the appropriate amount of secondary-butyllithium or n-butyllithium to react with residual impurities not removed with the conventional monomer purification procedures. The mixture was then heated to polymerization temperatures and the difunctional initiator solution then added, the butadiene polymerized initially to form the desired center block. When the polymerization of the butadiene was complete, the α-methylstyrene and styrene polymerized to form the desired end blocks. In general, two exothermic temperature rises were observed corresponding to the initial polymerization of the butadiene and the subsequent polymerization of the α-methylstyrene-styrene. When the copolymerization of the styrene was complete, the polymerization was inactivated by the addition of isopropanol or glacial acetic acid. The resultant triblock copolymer was of ABA configuration wherein A is a random copolymer of α-methylstyrene-styrene and B a polymer of butadiene was maintained as a solution in α-methylstyrene for blending experiments.

In a similar manner, block copolymers of AB configuration were prepared employing secondary-butyllithium as initiator and for comparative purposes styrene-butadiene-styrene (S-B-S) and styrene-butadiene (S-B) block copolymers were prepared. Table 4A shows polymerization conditions and characterization of the ABA copolymers. Table 4B shows that of the AB polymers. Table 4C shows the styrene-butadiene-styrene and styrene-butadiene polymers.

TABLE 4A

Polymerization Conditions and Characterization of αMS/S—B—αMS/S Block Copolymers

| Triblock α-MS/S—B—αMS/S | Feed Wt. % α-MS | Styrene | Butadiene | Initiator me/l | Initiation Temp. °C. | GPC Mol. Wt. | Wt. % Butadiene | Weight % α-MS In End Block |
|---|---|---|---|---|---|---|---|---|
| D | 90.22 | 2.45 | 7.33 | 1.07 | 70 | 494,000 | 58 | 53 |
| E | 87.00 | 3.60 | 9.40 | 1.54 | 65 | 217,300 | 59 | 46 |
| F | 86.58 | 3.19 | 10.24 | 2.99 | 40 | 116,000 | 60 | 54 |
| G | 87.00 | 3.60 | 9.40 | 1.24 | 55 | 369,000 | 56 | 52 |
| H | 87.00 | 3.60 | 9.40 | 1.41 | 55 | 240,000 | 53 | 56 |
| I | 86.34 | 2.71 | 10.95 | 2.18 | 55 | 172,000 | 63 | 58 |
| J | 87.35 | 3.49 | 9.16 | 2.85 | 46 | 103,000 | 50 | 61 |
| K | 88.86 | 6.25 | 4.89 | 3.12 | 50 | 111,000 | 28 | 50 |

TABLE 4B

Polymerization Conditions and Characterization of αMS/S Diblock Copolymers

| Diblock α-MS/S—B | Feed Wt. % α-MS | Styrene | Butadiene | S—BuLi me/l | Initiation Temp. °C. | GPC Mol. Wt. | Wt. % Butadiene | Weight % α-MS In Block |
|---|---|---|---|---|---|---|---|---|
| L | 87.00 | 3.60 | 9.40 | 0.78 | 60 | 469,300 | 58 | 48 |
| M | 87.00 | 3.60 | 9.40 | 1.22 | 60 | 194,900 | 58 | 47 |
| N | 87.00 | 3.60 | 9.40 | 0.98 | 55 | 395,000 | 54 | 55 |
| O | 87.00 | 3.60 | 9.40 | 1.14 | 55 | 241,000 | 54 | 55 |
| P | 86.34 | 2.71 | 10.95 | 1.52 | 55 | 166,000 | 64 | 56 |

TABLE 4C

Polymerization Conditions and Characterization of Styrene Butadiene Block Copolymers

| Block Copolymer | Type | Feed Wt. % Toluene | Styrene | Butadiene | Initiator me/l | Initiation Temp. °C. | GPC Mol. Wt. | Weight % Butadiene |
|---|---|---|---|---|---|---|---|---|
| R | SBS | 81.85 | 8.17 | 9.98 | 1.66 | 55 | 256,000 | 55 |
| S | SB | 81.85 | 8.17 | 9.98 | 1.72 | 55 | 264,000 | 56 |

The diblock copolymers were prepared in the same manner as the triblock copolymers except that the secondary-butyllithium having a concentration of about 0.5 n in cyclohexane was employed as the initiator. The styrene-butadiene-styrene and styrene-butadiene block copolymers set forth in Table 4C were prepared in a manner similar to that employed in the preparation of polymers for Table 4A and 4B with the exception that anhydrous toluene was employed in place of α-methylstyrene

PREPARATION V

Triblock Copolymers

The consecutive polymerization procedure described in preparation III was used to prepare three triblock copolymers with α-methylstyrene styrene copolymer as the end blocks and polybutadiene as the center block. Sample EE was an elastomeric triblock, only two consecutive polymerizations were used. The procedure for each of the consecutive polymerizations was similar to that used in Preparation IV. The initiation temperature was 40° C. and the temperature would then rise to a peak value until styrene (S) monomer was consumed and polymerization reaction stopped. A portion of the reaction solution was withdrawn and the percent solids in it was analyzed. The reaction mixture was then cooled to the initiation temperature and more butadiene (B) and styrene monomers added and then the initiator for the second initiation. Stabilizer, 0.25 percent Irganox 1076, 2 percent Ionol and 1 percent tris-nonyl-phenyl phosphite (based on the weight of the polymer) were added to the final syrup. The polymer was then recovered by devolatilizing in a vacuum oven at a temperature of 170° C. for a period of 45 minutes after the polymer reached 160° C.

Sample FF and GG were triblock copolymers with lower amounts of polybutadiene. Three consecutive polymerizations were used for each sample. The initiation temperature was 50° C. After each polymerization the temperature was maintained at 70° C. for 30 minutes before cooling to 25° C. for the withdrawal of sample for solids analysis. More butadiene and styrene monomers were then added and the mixture was heated to the initiation temperature of 50° C. at which temperature the initiator for the second polymerization was added. The stabilizers used were the same as those for sample EE and the polymers were recovered also the same way except that the temperature of devolatilization was 10° C. higher.

The conditions of polymerization for the three runs are given in Tables 5A, 5B, 5C and the molecular weights and compositions of the samples are given in Table 5D.

TABLE 5A

Polymerization Conditions for EE

| Step | α-MS kg | S kg | B kg | Initiator mmoles* | Isopropanol ml | Kg Removed for Analysis | Solids wt % |
|---|---|---|---|---|---|---|---|
| 1 | 56.16 | 1.56 | 7.94 | 210 | 19.4 | 2.37 | 17.5 |
| 2 | 0 | 1.44 | 6.54 | 151 | 23.0 | — | 28.3 |

*Millimoles

TABLE 5B

Polymerization Conditions for FF

| Step | α-MS kg | S kg | B kg | Initiator mmoles | Isopropanol ml | Kg Removed for Analysis | Solids wt % |
|---|---|---|---|---|---|---|---|
| 1 | 44.17 | 3.08 | 2.17 | 163 | none | 5.50 | 15.9 |
| 2 | 0 | 0.97 | 0.77 | 19.3 | none | 1.30 | 23.2 |
| 3 | 0 | 2.58 | 1.74 | 82.0 | 43 | — | 33.8 |

TABLE 5C

Polymerization Conditions for GG

| Step | α-MS kg | S kg | B kg | Initiator mmoles | Isopropanol ml | Kg Removed for Analysis | Solids wt % |
|---|---|---|---|---|---|---|---|
| 1 | 43.23 | 2.27 | 2.40 | 88.7 | 9.9 | 6.29 | 13.9 |
| 2 | 0 | 1.88 | 1.85 | 49.2 | 5.0 | 3.31 | 25.1 |
| 3 | 0 | 1.66 | 1.62 | 99.0 | 16 | — | 32.0 |

TABLE 5D

Molecular Weights and Compositions of Triblock Polymers EE, FF and GG

| Sample | GPC Molecular Weight | % B | Ratio α-MS/S |
|---|---|---|---|
| EE | 84,000 | 63.5 | 62/38 |
| FF | 79,000 | 29.9 | 48/52 |
| GG | 120,000 | 34.2 | 49/51 |

EXAMPLE 1

Blends Prepared by Coprecipitation from Solution

The solutions of α-methylstyrene-styrene copolymer and α-methylstyrene-styrene containing block copolymers dissolved in α-methylstyrene were mass precipitated by the addition of methanol, the precipitate dried and the precipitate dissolved in methylene chloride. The blends were stabilized by the addition of about 0.2 weight percent Ionol and 0.2 weight percent of Irganox 1076, the resultant blends were dried under vacuum overnight, compression molded and tensile strength, elongation, notched izod impact strength and the Vicat heat distortion temperature determined. The results are set forth in Table 6.

TABLE 6

Composition and Properties of Blends

| Blend No. | Composition α-MS/S Copolymer Sample | Composition α-MS/S Copolymer Wt. % | Block Copolymer Sample | Block Copolymer Wt. % | Wt. % Butadiene In Blend | Properties Tensile psi | Properties Elongation % | Properties Notched Izod ft-lb/in | Properties Vicat °C. |
|---|---|---|---|---|---|---|---|---|---|
| 1 | B | 74.0 | G | 26.0 | 14.5 | 2689 | 8.4 | 1.4 | 118 |
| 2 | B | 72.2 | N | 27.8 | 15.0 | 3863 | 1.8 | 0.97 | 119 |
| 3 | B | 71.9 | H | 28.1 | 15.0 | 3719 | 8.8 | 4.3 | 121 |
| 4 | B | 72.2 | O | 27.8 | 15.0 | 3695 | 1.7 | 2.6 | 121 |
| 5 | C | 76.7 | P | 23.3 | 15.0 | 3192 | 3.3 | 3.5 | 119 |
| 6 | C | 76.2 | I | 23.8 | 15.0 | 3131 | 9.7 | 4.8 | 120 |
| 7 | C | 70.0 | G | 30.0 | 16.8 | 3122 | 10.1 | 5.5 | 122 |
| 8 | C | 71.8 | H | 28.2 | 15.0 | 3343 | 12.3 | 6.4 | 122 |
| 9 | C | 72.3 | O | 27.7 | 15.0 | 3548 | 2.1 | 5.0 | 124 |
| 10 | C | 70.0 | J | 30.0 | 15.0 | 2452 | 23.8 | 5.7 | 120 |
| 11 | C | 46.4 | K | 53.4 | 15.0 | 5293 | 3.7 | 0.44 | 101 |

It is noted that the addition of the α-methylstyrene-styrene block copolymer results in a substantial increase in the impact resistance of the blends when compared to the impact resistance of the α-methylstyrene-styrene copolymer of Table I.

EXAMPLE 2

Comparison of α-Methylstyrene-Styrene Block Copolymers and Styrene Butadiene-Styrene Block Copolymers Blended with α-Methylstyrene-Styrene Copolymers The procedure of Example 1 was employed to prepare blends of styrene-butadiene, styrene-butadiene-styrene block copolymers with α-methylstyrene-styrene copolymers. In blending the styrene-butadiene and styrene-butadiene-styrene block copolymers, toluene was employed as a solvent for the styrene-butadiene-styrene blocks while α-methylstyrene was utilized as the solvent for the α-methylstyrene-styrene coplymers. The results are set forth in Table 7.

TABLE 7

Comparison of Blends Using α-MS Containing Block Copolymers with Those Using Styrene-Butadiene Copolymers

| Blend No. | Composition α-MS/S Copolymer Sample | Composition α-MS/S Copolymer Wt. % | Block Copolymer Sample | Block Copolymer Wt. % | Wt. % Butadiene In Blend | Properties Tensile psi | Properties Elongation % | Properties Notched Izod ft-lb/in | Properties Vicat °C. |
|---|---|---|---|---|---|---|---|---|---|
| 3 | B | 71.9 | H | 28.1 | 15.0 | 3719 | 8.8 | 4.3 | 121 |
| 4 | B | 72.2 | O | 27.8 | 15.0 | 3695 | 1.7 | 2.6 | 121 |
| 12 | B | 72.9 | R | 27.1 | 15.0 | 2622 | 8.3 | 2.0 | 118 |
| 13 | B | 73.4 | S | 26.6 | 15.0 | 2458 | 3.2 | 3.2 | 116 |

EXAMPLE 3

A fourteenth blend was prepared by coprecipitating 68.2 weight percent of Sample A and 31.8 weight percent of Sample D. Weight percent of butadiene polymer in the blend was 18.5. The resultant blend was then divided into 2 portions. One portion was mixed for a period of 10 minutes using a miniature Banbury mixer, employing as a stabilizer system 0.2 weight percent Ional and 0.2 weight percent trisnonylphenyl phosphite, the weights being based on the weight of the resin. The remaining portion was mixed on compounding rolls for a period of 5 minutes at a temperature of 210° C., employing a like quantity of the identical stabilizers. The resultant portions were ground to granular form, compression molded into test bars and the physical properties determined. The results are set forth in Table 8.

TABLE 8

| | Blend #14 After Mechanical Mixing | | | |
|---|---|---|---|---|
| Mixer Used | Tensile psi | Elongation % | Notch Izod ft-lb/in | Vicat °C. |
| Banbury | 3607 | 2.3 | 5.3 | 123 |
| Compounding Roll | 3739 | 1.6 | 4.8 | 127 |

EXAMPLE 4

Four blends were prepared in the manner as set forth in Example 1 with the exception that the stabilizers used were 0.25 weight percent Ionol and 0.25 Irganox 1076 based on the weight of the polymer blend. The resultant samples were compression molded and ground to granular form. Each of the examples was passed through a one-inch National Rubber Machinery single screw extruder and pelletized. The pelletized samples were subsequently injection molded into specimens for mechanical testing. The composition and physical properties of the samples are set forth in Table 9.

TABLE 9

| | Composition and Properties of Blends After Extrusion and Injection Molding | | | | | | | |
|---|---|---|---|---|---|---|---|---|
| Blend No. | α-MS/S Copolymer | | Block Copolymer | | Wt. % Butadiene In Blend | Tensile psi | Elongation % | Notched Izod ft-lb/in | Vicat °C. |
| | Sample | Wt. % | Sample | Wt. % | | | | | |
| 15 | A | 67.3 | E | 32.7 | 19.3 | 3756 | 32.8 | 4.0 | 121 |
| 16 | A | 67.3 | L | 32.7 | 19.0 | 3323 | 28.8 | 4.5 | 116 |
| 17 | A | 70.0 | F | 30.0 | 18.0 | 3645 | 16.8 | 2.5 | 117 |
| 18 | A | 67.4 | M | 32.6 | 18.9 | 4027 | 29.4 | 5.0 | 124 |

EXAMPLE 5

Blends 19 and 20 were made by consecutive polymerization in a reactor. In blend 19A triblock of about 100,000 molecular weight, 30 percent butadiene and an α-methylstyrene to styrene ratio of 48 to 52 in the end block copolymer was prepared first using the procedure described in Preparation IV. The initial feed had 92.6 parts of α-methylstyrene, 4 parts of styrene and 3.4 parts of butadiene all by weight. After the triblock polymerization five consecutive polymerizations were made in the same syrup to prepare an α-methylstyrene styrene copolymer of molecular weight of about 115,000 and of an α-methylstyrene to styrene ratio of 48 to 52. The procedure used was similar to that described in Preparation II. The polymer syrup at the end of all six consecutive polymerizations contained 42.3 weight percent solids and was a blend of 20 weight percent triblock copolymer and 80 weight percent α-methylstyrene styrene copolymer. The polymer recovery and stabilizer system used were the same as described in Preparation V.

Blend 20 was prepared by making two triblock copolymer polymerizations and then followed with three α-methylstyrene styrene copolymer polymerizations. The procedure used was the same as in blend 19. The final blend contained about 60 weight percent of a triblock copolymer with a molecular weight of about 97,000, a butadiene content of about 30 percent and an α-methylstyrene to styrene ratio of 48 to 52 for the end blocks and an α-methylstyrene styrene copolymer of a molecular weight of about 145,000 and an α-methylstyrene and styrene ratio of 48 to 52.

Blend 21 was prepared by melt blending in a twin screw extruder, 85 parts of blend 20 and 15 parts of triblock copolymer sample EE.

Blend 22 was prepared by dissolving in toluene at a concentration of approximately 35 percent solids by weight of a triblock copolymer sample FF and an α-methylstyrene styrene copolymer sample CC. The solution was then dried in a heated vacuum oven. The final polymer contained 1 percent trisnonylphenyl phosphite, about 0.75 percent Ionol and 0.25 percent Irganox 1076.

All these four blends are high clarity, i.e., transparent, resins and their properties are listed in Table 10.

TABLE 10

| | Blends of Alphamethylstyrene/Styrene Copolymer and Alphamethylstyrene/Styrene-Butadiene-Alphamethylstyrene/Styrene Triblock Polymers - Clear Resins | | | | | | | |
|---|---|---|---|---|---|---|---|---|
| Blends | % Butadiene in Blend | Melt Flow Rate (Schedule I) | Properties of Blends (Injection Molded Data) | | | | | |
| | | | Vicat (°C.) | Tensile Yield (psi) | Tensile Rupture (psi) | Elong. (%) | Tensile Modulus (psi × 10$^{-5}$) | Izod (Ft. lb/in Notch) |
| 19 | 6.5 | 5.0 | 124 | — | 7640 | 1.9 | 4.4 | 0.4 |
| 20 | 17.6 | 3.5 | 114 | 6485 | 5300 | 9.7 | 3.6 | 0.6 |
| 21 | 19.4 | 5.1 | 111 | 6105 | 4500 | 23 | 3.6 | 0.6 |
| 22 | 22 | 2.4 | 124 | 5570 | 3465 | 18 | 3.1 | 0.5 |

EXAMPLE 6

Four blends (23, 24, 25 and 26) of α-ms/s copolymer and triblock polymer (both of which contained stabilizers) were dry blended and subsequently extruded twice on a twin screw extruder. The pellets were then injection molded for property data which is set forth in Table 11.

TABLE 11

Extrusion Blends of Alphamethylstyrene/Styrene Copolymer and
Alphamethylstyrene/Styrene-Butadiene-Alphamethylstyrene/Styrene
Triblock Polymers - Clear Resins

| Blends | α-MS Copolymer Sample | Butadiene Triblock Sample | % Butadiene in Blend | Melt Flow Rate (Schedule I) | Properties of Blends (Injection Molded Data) | | | | | |
|---|---|---|---|---|---|---|---|---|---|---|
| | | | | | Vicat (°C.) | Tensile Yield (psi) | Tensile Rupture (psi) | Elong. (%) | Tensile Modulus (psi × $10^{-5}$) | Izod (Ft. lb/in Notch) |
| 23 | DD | — | 0 | 1.5 | 134 | — | 8570 | 1.8 | 5.5 | 0.4 |
| 24 | DD | EE | 8 | 0.8 | 133 | — | 7395 | 2.4 | 4.6 | 0.6 |
| 25 | DD | EE | 12 | 0.7 | 135 | 6895 | 6765 | 2.6 | 4.4 | 0.7 |
| 26 | DD | EE | 16 | 0.6 | 133 | 5045 | 3945 | 22 | 3.9 | 2.0 |

EXAMPLE 7

An additional four blends (27, 28, 29 and 30) were prepared using the following procedure. The copolymer and triblock were dissolved in toluene at a concentration of approximately 35 percent solids by weight. The polymer solution was dried in a heated vacuum oven. The final polymer contained 1 percent trisnonyl phenyl phosphite ~0.75 percent Ionol and 0.25 percent Irganox 1076. The polymer was ground into granules and injection molded.

TABLE 12

Solution Blends of Alphamethylstyrene/Styrene Copolymer and
Alphamethylstyrene/Styrene-Butadiene-Alphamethylstyrene/Styrene
Triblock Polymers - Opaque Resins

| Blends | α-MS Copolymer Sample | Butadiene Triblock Sample | % Butadiene in Blend | Melt Flow Rate (Schedule I) | Properties of Blends (Injection Molded Data) | | | | | |
|---|---|---|---|---|---|---|---|---|---|---|
| | | | | | Vicat (°C.) | Tensile Yield (psi) | Tensile Rupture (psi) | Elong. (%) | Tensile Modulus (psi × $10^{-5}$) | Izod (Ft. lb/in Notch) |
| 27 | AA + BB$^a$ | EE | 15 | 0.7 | 123 | 4995 | 4445 | 28 | 3.4 | 1.7 |
| 28 | CC | EE | 15 | 7.7 | 129 | 5495 | 5350 | 2.0 | 4.1 | 0.7 |
| 29 | AA + BB$^a$ | EE | 20 | 0.5 | 124 | 3495 | 3300 | 30 | 2.4 | 6.0 |
| 30 | CC | EE | 20 | 10 | 114 | 3630 | 2850 | 14 | 3.3 | 4.3 |

In a manner similar to the foregoing, other advantageous copolymer blends are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A copolymer blend suitable for impact resistant moldings, the blend consisting essentially of a copolymer of an alkenyl aromatic monomer and an isopropenyl aromatic monomer wherein the ratio of isopropenyl aromatic monomer to alkenyl aromatic monomer is from about 1 to 99 to 99 to 1 in admixture with a member selected from a group consisting of
   (1) an AB block copolymer
   (2) an ABA block copolymer
   (3) an AB(BA)$_n$ block copolymer
and mixtures thereof wherein n is an integer of from about 2 to 10; A represents a block of an alkenyl aromatic monomer-isopropenyl aromatic monomer copolymer; B is a block of conjugated diene elastomer; the A blocks having a ratio of isopropenyl aromatic monomer to alkenyl aromatic monomer of from about 1 to 99 to 99 to 1 by weight, the molecular weight of the copolymer being from about 50,000 to 1,000,000, the block copolymers containing from about 10 to 90 weight percent of a diene elastomer selected from the group consisting of polybutadiene, polyisoprene and copolymers of butadiene and isoprene wherein the 1,2-vinyl content is from about 8 to 50 weight percent; the block copolymers having a molecular weight of from about 30,000 to about 800,000.

2. The polymer blend of claim 1 wherein the A blocks have a ratio of isopropenyl aromatic monomer to alkenyl aromatic monomer of from about 30 to 70 to about 71 to 29.

3. The blend of claim 1 wherein the molecular weight of the copolymer of isopropenyl aromatic monomer and alkenyl aromatic monomer is from about 70,000 to 500,000 grams per mole.

4. The copolymer blend of claim 1 wherein the weight in proportion of the B block in the block copolymers is from about 10 to 90 weight percent based on the total weight of the block copolymer.

5. The copolymer blend of claim 1 wherein the molecular weight of the block copolymer is from about 30,000 to 800,000 grams per mole.

6. The copolymer blend of claim 1 wherein the molecular weight of the block copolymer is from about 50,000 to 500,000 grams per mole.

7. The copolymer blend of claim 1 wherein the isopropenyl aromatic monomer is α-methylstyrene and the alkenyl aromatic monomer is styrene.

* * * * *

UNITED STATES PATENT AND TRADEMARK OFFICE
CERTIFICATE OF CORRECTION

PATENT NO. : 4,525,532

DATED : June 25, 1985

INVENTOR(S) : Lu H. Tung; Gracy Y. Lo; Jerald A. Griggs

It is certified that error appears in the above-identified patent and that said Letters Patent is hereby corrected as shown below:

Column 9, line 45, insert a period following "tyrene".

Column 12, line 43, "coplymers" should read --copolymers--.

Column 15, line 3, "Clear Resins" should read --Opaque Resins--.

Signed and Sealed this

Twenty-fourth Day of December 1985

[SEAL]

Attest:

DONALD J. QUIGG

Attesting Officer

Commissioner of Patents and Trademarks